(12) United States Patent
Chen et al.

(10) Patent No.: US 8,193,757 B2
(45) Date of Patent: Jun. 5, 2012

(54) PHOTOVOLTAIC CIRCUIT

(75) Inventors: Yaow-Ming Chen, Minsyong Township, Chiayi County (TW); Fu-Yang Shih, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 487 days.

(21) Appl. No.: 12/426,338

(22) Filed: Apr. 20, 2009

(65) Prior Publication Data
US 2009/0315507 A1 Dec. 24, 2009

(30) Foreign Application Priority Data

Jun. 19, 2008 (TW) .............................. 97122838 A

(51) Int. Cl.
*H01M 10/44* (2006.01)
*H02J 7/00* (2006.01)
*H01M 10/46* (2006.01)

(52) U.S. Cl. ........ 320/101; 320/138; 320/139; 136/291; 323/906

(58) Field of Classification Search .................... 320/101
See application file for complete search history.

(56) References Cited

U.S. PATENT DOCUMENTS

| | | | | |
|---|---|---|---|---|
| 5,811,958 A | * | 9/1998 | Yamamoto | 320/101 |
| 6,838,611 B2 | * | 1/2005 | Kondo et al. | 136/244 |
| 8,013,566 B2 | * | 9/2011 | Haines | 320/101 |
| 2003/0094921 A1 | * | 5/2003 | Lau et al. | 320/101 |
| 2006/0171182 A1 | * | 8/2006 | Siri et al. | 363/131 |
| 2006/0174939 A1 | * | 8/2006 | Matan | 136/293 |
| 2007/0236187 A1 | * | 10/2007 | Wai et al. | 323/222 |
| 2008/0084177 A1 | * | 4/2008 | Sander et al. | 320/101 |

FOREIGN PATENT DOCUMENTS

JP 1994-324752 11/1994

OTHER PUBLICATIONS

English translation of abstract of JP 1994-324752.
Korean Office Action dated Nov. 25, 2010.
English translation of Korean Office Action dated Nov. 25, 2010.

* cited by examiner

*Primary Examiner* — Yalkew Fantu
(74) *Attorney, Agent, or Firm* — Thomas, Kayden, Horstemeyer & Risley, LLP

(57) ABSTRACT

A photovoltaic circuit configured to supply an output current to a tank module is provided. The photovoltaic circuit comprises a photovoltaic transformation module, a first process module, a plurality of second process modules, and a first control module. The process modules are connected to each other in parallel. The process modules in the parallel connection are connected to the photovoltaic transformation module and the tank module in series. The first control module is connected to the first process module and generates a control signal to the process modules in response to a divided current, a modulation current, and a last output current generated by the first process module. Thereby, the process modules interlacedly output the corresponding modulation current as the output current supplied to the energy reserve module.

15 Claims, 14 Drawing Sheets

PHOTOVOLTAIC CIRCUIT

This application claims the benefit of priority based on Taiwan Patent Application No. 097122838 filed on Jun. 19, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a photovoltaic circuit. More specifically, the present invention relates to a photovoltaic circuit capable of outputting a current in an interlaced way.

2. Descriptions of the Related Art

In recent years, forced by high price of crude oil and the Kyoto Protocol which imposes a restriction on the global emission of greenhouse gases, almost all nations around the world begin to attach great importance to various new energy sources and alternative energy sources. This has led to booming development of the solar energy industry, and as one of the important bases of hi-tech industries.

The most well-known sector in the solar energy industry is the solar cell sector (termed as a solar photovoltaic circuit hereinafter). A solar photovoltaic circuit utilizes a photovoltaic transformation module to transform the solar energy into an electric current and store the electric energy in a tank module (usually a battery). However, the photovoltaic circuit usually just connect the photovoltaic panel directly to the tank module through a switching device. It is not good at the solar energy efficiency and charging efficiency.

In view of these problems, efforts still have to be made in the art to provide a solution that can effectively drain the maxima power from the photovoltaic panels and charging the tank module.

SUMMARY OF THE INVENTION

One objective of the present invention is to provide a photovoltaic circuit for supplying an output current and charging the tank module. The photovoltaic circuit is connected to a tank module to supply the output current to the tank module. The photovoltaic circuit comprises a photovoltaic transformation module, a first process module, a plurality of second process modules and a control module. The photovoltaic transformation module is configured to receive an optical energy and transform the optical energy into a current. The first process module is connected to the photovoltaic transformation module and the tank module in series, and configured to generate a first divided current in response to the current and modulate the first divided current to generate a first modulation current. The second process modules are connected to the first process module in parallel, and the first process module and the second process modules connected in parallel are connected to the photovoltaic transformation module and the tank module in series. The second process modules are configured to generate a plurality of second divided currents in response to the current and modulate the second divided currents to generate a plurality of second modulation currents. The control module is connected to the first process module and the second process modules. The control module is configured to generate a control signal to the process modules in response to the first divided current, the first modulation current and a last output current, so that the process modules output the modulation currents as the output current supplied to the tank module in an interlaced way.

Another objective of the present invention is to provide a photovoltaic circuit for supplying an output current. The photovoltaic circuit is connected to a tank module to supply the output current to the tank module. The photovoltaic circuit comprises a plurality of photovoltaic transformation modules, a first process module, a plurality of second process modules and a control module. Each of the photovoltaic transformation modules is configured to receive an optical energy and transform the optical energy into a current. The photovoltaic transformation modules consist of a first photovoltaic transformation module and a plurality of second photovoltaic transformation modules. The first process module is connected to the first photovoltaic transformation module of the photovoltaic transformation modules and the tank module in series, and is configured to generate a first modulation current by modulating the current of the first photovoltaic transformation module. The second process modules are connected to the first process module in parallel and correspond to the second photovoltaic transformation modules in one-to-one way. Each of the second process modules connected in parallel is connected to the corresponding second photovoltaic transformation module and the tank module in series. The second process modules are configured to modulate the currents to generate a plurality of second modulation currents. The control module is connected to the first process module and the second process modules, and is configured to generate a control signal to the process modules in response to the current of the first photovoltaic transformation module, the first modulation current and a last output current so that the process modules output the modulation currents as the output current supplied to the tank module in an interlaced way.

Yet another objective of the present invention is to provide a photovoltaic circuit for supplying an output current. The photovoltaic circuit is coupled to a tank module and a photovoltaic transformation module. The photovoltaic transformation module is configured to receive an optical energy and transform the optical energy into a current. The photovoltaic circuit is configured to receive and modulate the current as the output current to be supplied to the tank module. The tank module generates a tank status signal. The photovoltaic circuit comprises a first process module and a first control module. The first process module is coupled to the photovoltaic transformation module and the tank module, and is configured to process the current to generate a first modulation current. The first control module is connected to the first process module and the tank module, and is configured to generate a charge protection signal in response to the tank status signal of the tank module so that the first process module outputs the first modulation current as the output current supplied to the tank module in response to the charge protection signal.

Yet a further objective of the present invention is to provide a photovoltaic circuit for supplying an output current. The photovoltaic circuit is coupled to a tank module and a plurality of photovoltaic transformation modules. Each of the photovoltaic transformation modules is configured to receive an optical energy and transform the optical energy into a current. The photovoltaic circuit is configured to receive and modulate the current as the output current supplied to the tank module.

The photovoltaic transformation modules consist of a first photovoltaic transformation module and a plurality of second photovoltaic transformation modules. The photovoltaic circuit comprises a first process module, a plurality of second process modules and a first control module. The first process module is connected to the first photovoltaic transformation module of the photovoltaic transformation modules and the tank module in series, and is configured to generate a first modulation current by processing the current of the first photovoltaic transformation module. The second process modules are connected to the first process module in parallel and correspond to the second photovoltaic transformation modules in one-to-one way. Each of the second process modules connected in parallel is connected to the corresponding second photovoltaic transformation module and the tank module in series. The second process modules are configured to process the currents to generate a plurality of second modulation currents. The first control module is connected to the first process module, the second process modules the tank module, and is configured to generate a charge protection signal in response to a tank status signal of the tank module so that the process modules output the modulation currents as the output current supplied to the tank module in response to the charge protection signal.

The control module of the present invention is implemented by a hardware circuit without need of additional program codes programmed by a software engineer. Moreover, the process modules of the present invention are connected in parallel to reduce power of the current, thus preventing damage of the control modules due to a too large current power.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
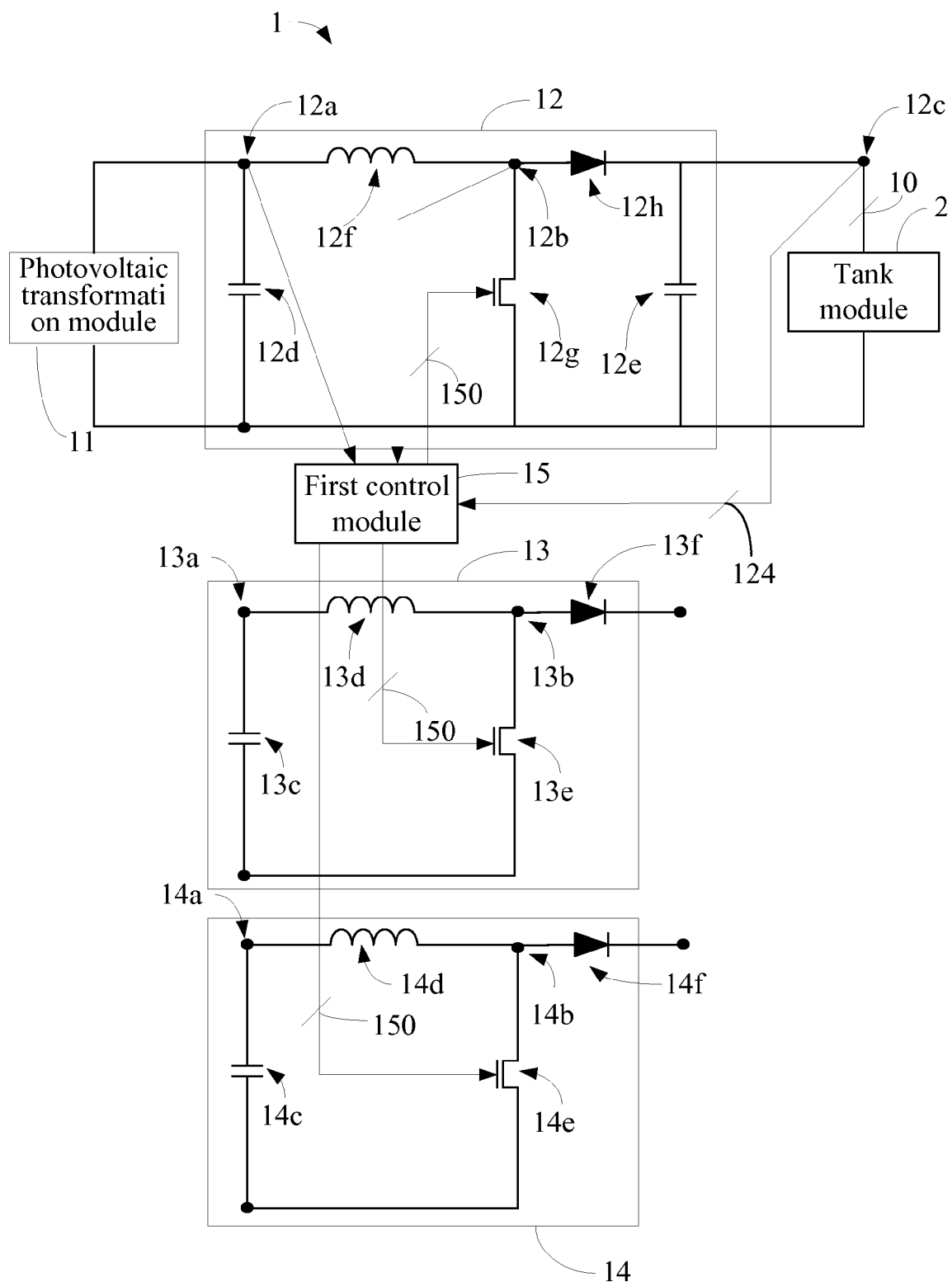
FIG. 1 is a schematic view of a first embodiment of the present invention.

A first embodiment of the present invention is illustrated in FIG. 1, which is a schematic view of a photovoltaic circuit 1. The photovoltaic circuit 1 is coupled to a tank module 2 and a photovoltaic transformation module 11. The photovoltaic transformation module 11 is configured to receive an optical energy and transform the optical energy into a current. The photovoltaic circuit 1 is configured to receive and modulate the current into an output current 10 to be supplied to the tank module 2. The photovoltaic circuit 1 comprises a first process module 12, a plurality of second process modules (i.e., a second process module 13 and a second process module 14 in this preferred embodiment) and a first control module 15. It should be noted that, the number of the second process modules is not intended to limit the present invention; and in other embodiments, another number of the second process modules may be used.

The first process module 12, which is coupled between the photovoltaic transformation module 11 and the tank module 2, is configured to generate a first divided current at a juncture 12a in response to the current and modulate the first divided current to generate a first modulation current at the juncture 12b.

The second process module 13 and the second process module 14 are connected to the first process module 12 in parallel. The second process module 13, the second process module 14 and the first process module 12 connected in parallel are connected to the photovoltaic transformation module 11 and the tank module 2 in series. The second process modules 13, 14 are configured to generate two second divided currents at junctures 13a, 14a respectively in response to the current and modulate the second divided currents to generate two second modulation currents at junctures 13b, 14b respectively.

The first control module 15 is connected to the first process module 12 and the second process modules 13, 14. The first control module 15 is configured to generate a control signal 150 to the process modules (i.e., the first process module 12 and the second process modules 13, 14) in response to the first divided current, the first modulation current and a last output current 124 at the juncture 12c so that, in an interlaced way, the process modules output the modulation currents as the output current 10 to be supplied to the tank module 2. That is, the tank module 2 uses the juncture 12c as an energy input terminal to receive the output current 10.

Particularly, the first process module 12 comprises a first capacitor 12d, a second capacitor 12e, a first inductor 12f, a first switch element 12g, and a first direction element 12h. The first capacitor 12d has a positive terminal, the first switch element 12g has a source and a gate, and the first direction element 12h has a positive terminal and a negative terminal. The first capacitor 12d is connected to the photovoltaic transformation module 11, the first switch element 12g, the second capacitor 12e, and the tank module 2 in parallel. The first inductor 12f is connected to the positive terminal of the first capacitor 12d and the source of the first switch element 12g. The positive terminal of the first direction element 12h is connected to the source of the first switch element 12g, and the negative terminal of the first direction element 12h is connected to the positive terminal of the first capacitor 12d. The first control module 15 is further connected to the gate of the first switch element 12g of the first process module 12, so that the first switch element 12g operates to control output of the first modulation current in response to the control signal 150. It should be noted that, the first capacitor 12d and the second capacitor 12e may be omitted upon practical conditions in other embodiments, not affecting operations and functions of the photovoltaic circuit 1; this will be readily appreciated by those skilled in the art and thus will not be described again herein.

Additionally, the first control module 15 is further connected to the juncture 12a of the photovoltaic transformation module 11, the positive terminal of the first capacitor 12d and the first inductor 12f to receive the first divided current 120. The first control module 15 is further connected to the juncture 12b of the first inductor 12f, the source of the first switch element 12g and the positive terminal of the first direction element 12h to receive the first modulation current 122. The first control module 15 is further connected to the juncture 12c of the negative terminal of the first direction element 12h, the second capacitor 12e and the tank module 2 to receive the last output current 124.

Next, a structure of the second process module 13 will be described. The second process module 13 comprises a third capacitor 13c, a second inductor 13d, a second switch element 13e and a second direction element 13f. The third capacitor 13c has a positive terminal, the second switch element 13e has a source and a gate, and the second direction element 13f has a positive terminal and a negative terminal. The third capacitor 13c is connected to the photovoltaic transformation module 11, the second switch element 13e and the tank module 2 in parallel. The second inductor 13d is connected to the positive terminal of the third capacitor 13c and the source of the second switch element 13e. The positive terminal of the second direction element 13f is connected to the source of the second switch element 13e, and the negative terminal of the second direction element 13f is connected to the positive terminal of the third capacitor 13c. The first control module 15 is coupled to the gate of the second switch element 13e of the second process module 13 so that the second switch element 13e of the second process module 13 operates to control output of the second modulation current in response to the control signal. It should be noted that, the third capacitor 13c may be omitted upon practical conditions in other embodiments, not affecting operations and functions of the photovoltaic circuit 1; this will be readily appreciated by those skilled in the art and thus will not be described again herein.

Additionally, the second process module 14 comprises a third capacitor 14c, a second inductor 14d, a second switch element 14e and a second direction element 14f. The third capacitor 14c has a positive terminal, the second switch element 14e has a source and a gate, and the second direction element 14f has a positive terminal and a negative terminal. Elements of the second process module 14 are connected in the same way as those of the second process module 13, and thus no redundant description will be made herein. It should be noted that, the third capacitor 14c may be omitted upon practical conditions in other embodiments, not affecting operations and functions of the photovoltaic circuit 1; this will be readily appreciated by those skilled in the art and thus will not be described again herein.

It should be noted that, this structure of the photovoltaic circuit 1 may be viewed as a low-side buck structure in this field. However, the present invention may also be implemented as a high-side buck structure, a high-side buck-boost structure or a low-side buck-boost structure; this will be readily appreciated by those skilled in the art upon reviewing the above embodiment, and thus will not be further described herein.

Figure 2:
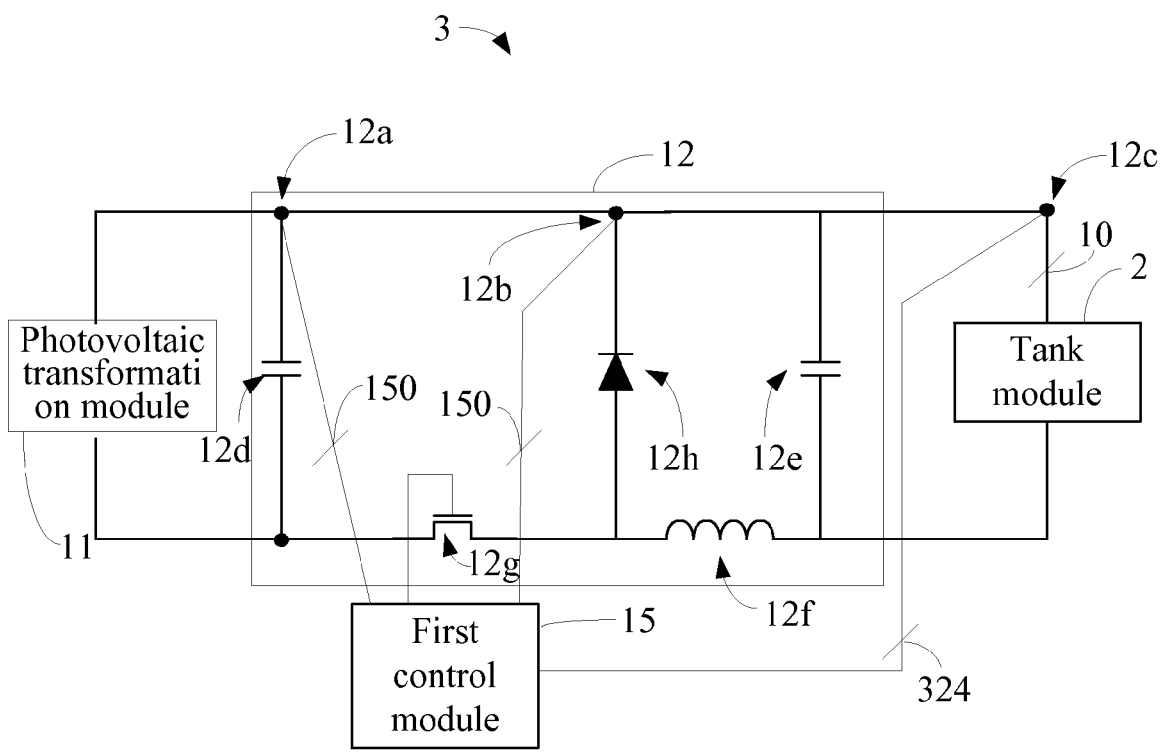
FIG. 2 is a schematic partial view of another example of the first embodiment of the present invention.

Another example of this embodiment is illustrated in FIG. 2, which is a schematic partial view of a photovoltaic circuit 3. Only differences between the photovoltaic circuit 3 and the photovoltaic circuit 1 will be described, and identical portions of which are omitted herein.

Differences between the photovoltaic circuit 3 and the photovoltaic circuit 1 is in the connection of elements of the first process module 12. The first process module 12 comprises a first capacitor 12d, a second capacitor 12e, a first inductor 12f, a first switch element 12g and a first direction element 12h. The first capacitor 12d has a negative terminal, the first switch element 12g has a source, a gate and a drain, and the first direction element 12h has a positive terminal.

The first capacitor 12d is connected to the photovoltaic transformation module 11, the first direction element 12h, the second capacitor 12e and the tank module 2 in parallel. The source of the first switch element 12g is connected to the negative terminal of the first capacitor 12d, the drain of the first switch element 12g is connected to the positive terminal of the first direction element 12h and the first inductor 12f. The first inductor 12f is connected to the second capacitor 12e and the tank module 2. The first control module 15 is further connected to the gate of the first switch element 12g of the first process module 12 so that the first switch element 12g operates to control output of the first modulation current in response to the control signal 150.

Additionally, the first control module 15 is further connected to the juncture 12a of the photovoltaic translation module 11 and a positive terminal of the first capacitor 12d to receive the first divided current 320. The first control module 15 is further connected to the juncture 12b of the first inductor 12f, the drain of the first switch element 12g and the positive terminal of the first direction element 12h to receive the first modulation current 322. The first control module 15 is further connected to the juncture 12c of the second capacitor 12e and the tank module 2 to receive a last output current 324.

Figure 3:
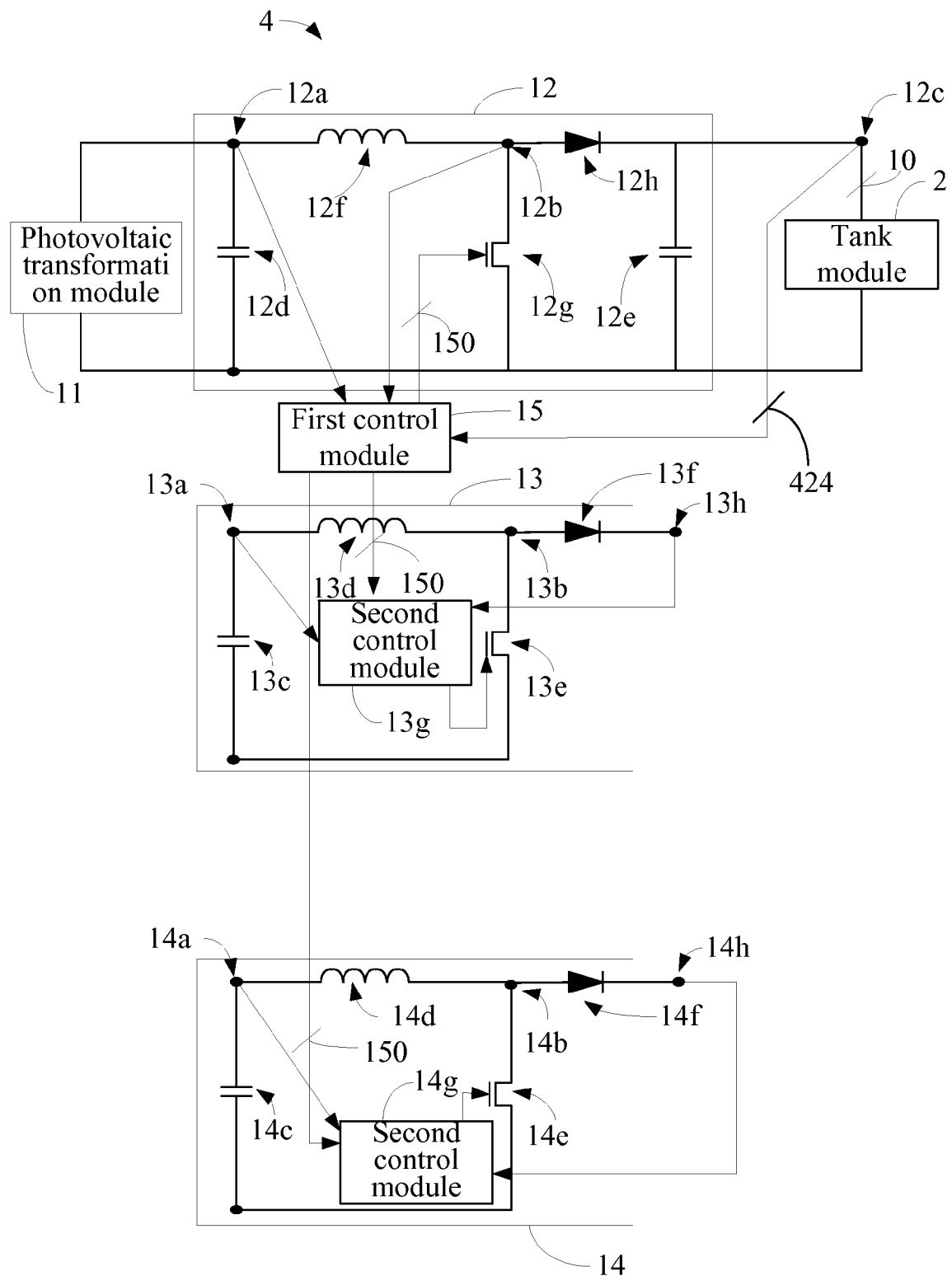
FIG. 3 is a schematic view of yet another example of the first embodiment of the present invention.

Yet another example of this embodiment is illustrated in FIG. 3, which is a schematic partial view of a photovoltaic circuit 4. Hereinafter, only differences between the photovoltaic circuit 4 and the photovoltaic circuit 1 will be described, and identical portions of the photovoltaic circuit 4 and the photovoltaic circuit 1 is omitted herein.

The photovoltaic circuit 4 differs from the photovoltaic circuit 1 in the second process modules 13, 14. The second process module 13 comprises a third capacitor 13c, a second inductor 13d, a second switch element 13e, a second direction element 13f and a second control module 13g. The third capacitor 13c has a positive terminal, the second switch element 13e has a source and a gate, and the second direction element 13f has a positive terminal and a negative terminal. The third capacitor 13c is connected to the photovoltaic transformation module 11, the second switch element 13e, and the tank module 2 in parallel. The second inductor 13d is connected to the positive terminal of the third capacitor 13c and the source of the second switch element 13e. The positive terminal of the second direction element 13f is connected to the source of the second switch element 13e and the negative terminal of the second direction element 13f is connected to the positive terminal of the third capacitor 13c. The second control module 13g is connected to the gate of the second switch element 13e. The first control module 15 is connected to the second control module 13g so that the second control module 13g enables the second switch element 13e of the second process module 13 to operate to control output of the second modulation current in response to the control signal 150.

Particularly, the second control module 13g is further configured to generate the second modulation current according to the second divided current at the juncture 13a and a last output current 424 at a juncture 13h. The second control module 13g is further connected to a juncture of the photovoltaic transformation module 11, the positive terminal of the third capacitor 13c and the first inductor 12f to receive the second divided current. The second control module 13g is further connected to the negative terminal of the second direction element 13f to receive the last output current 424.

Figure 4:
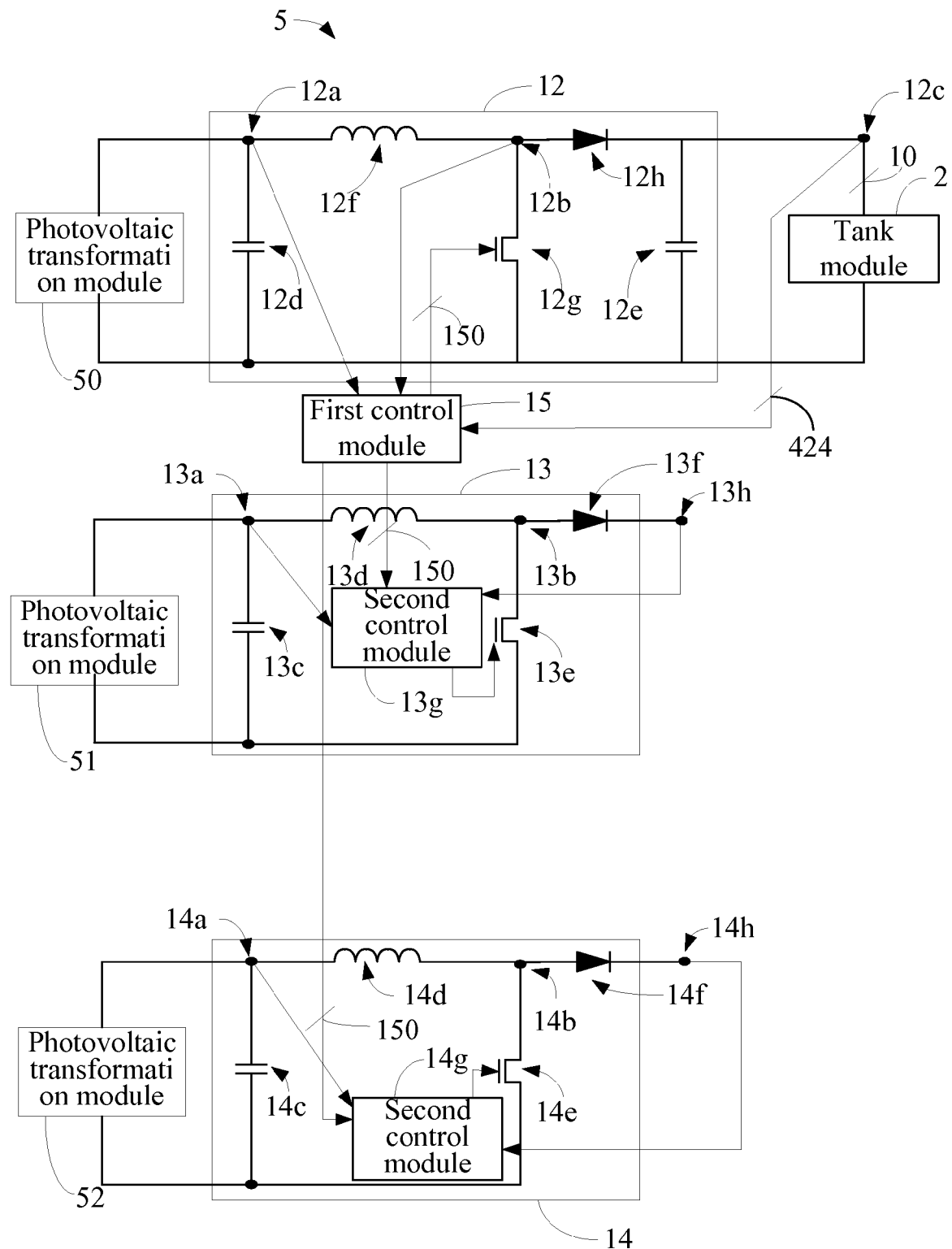
FIG. 4 is a schematic view of a second embodiment of the present invention.

A second embodiment of the present invention is illustrated in FIG. 4, which is a schematic view of a photovoltaic circuit 4. Hereinafter, only differences between the photovoltaic circuit 5 and the photovoltaic circuit 4 will be described, and identical portions of the photovoltaic circuit 5 and the photovoltaic circuit 4 are omitted herein.

The photovoltaic circuit 5 differs from the photovoltaic circuit 4 in that the first process module 12 is connected to the first photovoltaic transformation module 50, and the second processing modules 13, 14 are connected to the second photovoltaic transformation modules 51, 52 respectively. The functions will be readily appreciated by those skilled in the art and thus will not be further described herein.

Figure 5:
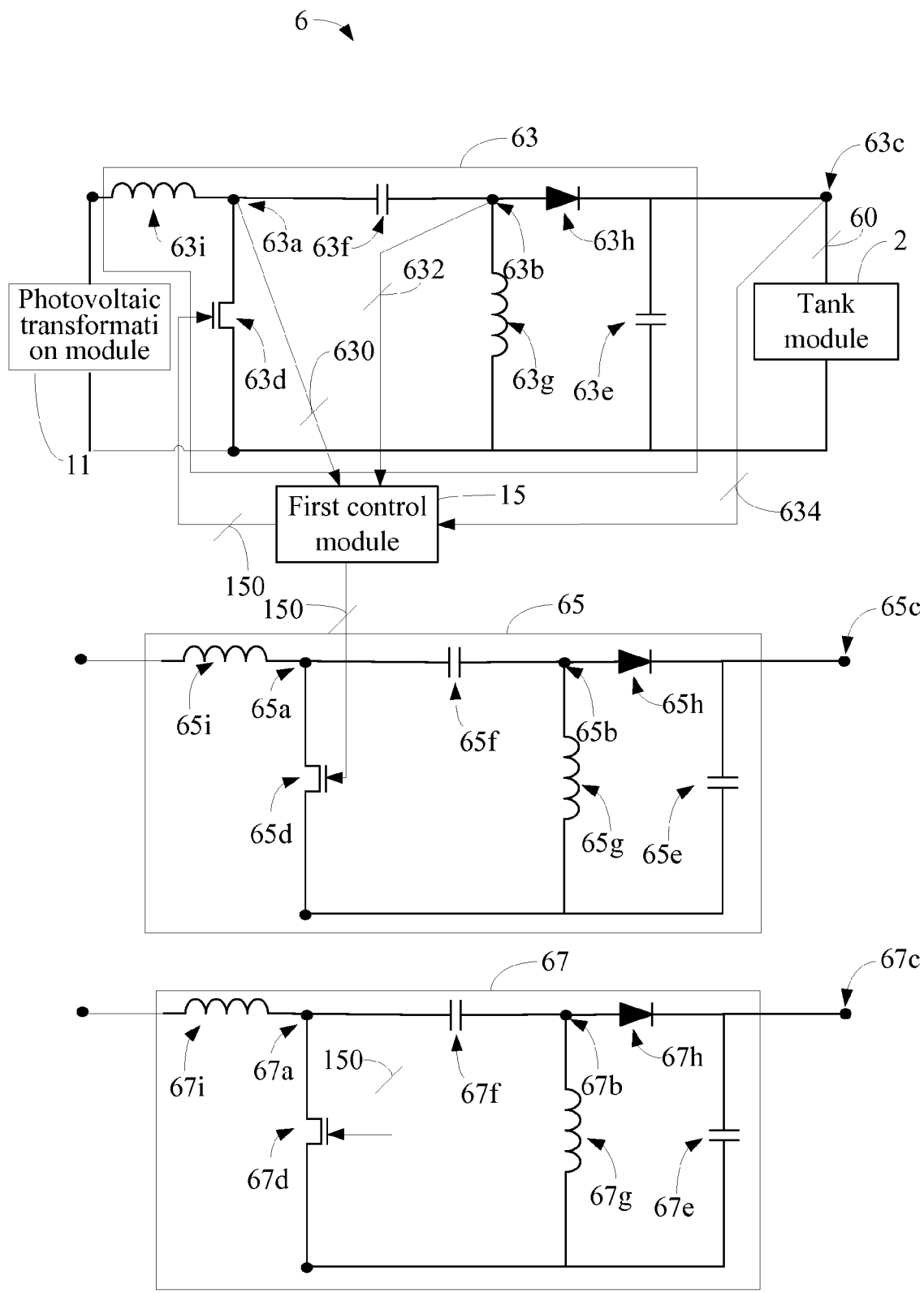
FIG. 5 is a schematic view of a third embodiment of the present invention.

A third embodiment of the present invention is illustrated in FIG. 5, which is a schematic view of a photovoltaic circuit 6. The photovoltaic circuit 6 is coupled to a tank module 2 and a photovoltaic transformation module 11. The photovoltaic transformation module 11 is configured to receive an optical energy and transform the optical energy into a current. The photovoltaic circuit 6 is configured to receive and modulate the current into an output current 60 to be supplied to the tank module 2. The photovoltaic circuit 6 comprises a first process module 63, a plurality of second process modules (i.e., a second process module 65 and a second process module 67 in this preferred embodiment) and a first control module 15. It should be emphasized that, the number of the second process modules is not intended to limit scope of the present invention, and in other embodiments, another number of the second process modules may be used.

The first process module 12, which is coupled to the photovoltaic transformation module 11 and the tank module 2, is configured to generate a first divided current 630 at a juncture 63a in response to the current and modulate the first divided current 630 to generate a first modulation current 632 at a juncture 63b.

The second process module 65 and the second process module 67 are connected to the first process module 63 in parallel. The second process module 65, the second process module 67 and the first process module 63 connected in parallel are connected to the photovoltaic transformation module 11 and the tank module 2 in series. The second process modules 65, 67 are configured to generate two second divided currents at junctures 65a, 67a respectively in response to the current, and modulate the second divided currents to generate two second modulation currents at junctures 65b, 67b respectively.

The first control module 15 is connected to the first process module 63 and the second process modules 65, 67. The control module 15 is configured to generate a control signal 150 to the process modules (i.e., the first process module 63 and the second process modules 65, 67) in response to the first divided current 630, the first modulation current 632, a last output current 634 at the juncture 63c and a maximum power point tracking (MPPT) way so that, in an interlaced way, the process modules output the modulation currents as the output current 60 to be supplied to the tank module 2.

Particularly, the first process module 63 comprises a first capacitor 63f, a second capacitor 63e, a first inductor 63i, a second inductor 63g, a first switch element 63d, and a first direction element 63h. The first capacitor 63f has a positive terminal and a negative terminal, the second capacitor 63e has a positive terminal, the first switch element 63d has a source, a drain and a gate, and the first direction element 63h a positive terminal. The first switch element 63d is connected to the photovoltaic transformation module 11, the first inductor 63i, the second capacitor 63e, and the tank module in parallel. The first inductor 63i is connected to the photovoltaic transformation module 11 and the source of the first switch element 63d. The positive terminal of the first capacitor 63f is connected to the first inductor 63i and the source of the first switch element 63d. The negative terminal of the first capacitor 63f is connected to the second inductor 63g and the positive terminal of the first direction element 63h. The positive terminal of the first direction element 63h is connected to the second inductor 63g and the negative terminal of the first direction element 63h is connected to the positive terminal of the second capacitor 63e. The first control module 15 is further connected to the gate of the first switch element 63d of the first process module 63 so that the first switch element 63d operates to control output of the first modulation current in response to the control signal 150. It should be noted that, the first capacitor 63f and the second capacitor 63e may be omitted upon practical conditions in other embodiments, not affecting operations and functions of the photovoltaic circuit 6; this will be readily appreciated by those skilled in the art and thus will not be described again herein.

Additionally, the first control module 15 is further connected to a juncture 63a of the photovoltaic transformation module 11, the positive terminal of the first capacitor 63f and the source of the first switch element 13d to receive the first divided current 630. The first control module 15 is further connected to a juncture 63b of a negative terminal of the first capacitor 63f, the second inductor 63g and the positive terminal of the first direction element 63h to receive the first modulation current 632. The first control module 15 is further connected to a juncture 63c of the second capacitor 63e, the first direction element 63h and the tank module 2 to receive the last output current 634.

Next, a structure of the second process module 65 will be described. The second process module 65 comprises a third capacitor 65f, a fourth capacitor 65e, a third inductor 65i, a fourth inductor 65g, a second switch element 65d and a second direction element 65h. The third capacitor 65f has a positive terminal and a negative terminal, the fourth capacitor 65e has a positive terminal, the second switch element 65d has a source, a gate and a drain, and the second direction element 65h has a positive terminal.

The second switch element 65d is connected to the photovoltaic transformation module 11, the fourth inductor 65g, the fourth capacitor 65e and the tank module 2 in parallel. The third inductor 65i is connected to the photovoltaic transformation module 11 and the second switch element 65d. The positive terminal of the third capacitor 65f is connected to the third inductor 65i and the source of the second direction element 65d. The negative terminal of the third capacitor 65f is connected to the fourth inductor 65g and the positive terminal of the second direction element 65h. The positive terminal of the second direction element 65h is further connected to the fourth inductor 65g. The negative terminal of the second direction element 65h is connected to the positive terminal of the fourth capacitor 65e. The first control module 15 is further connected to the gate of the second switch element 65d of the second process module 65 so that the second switch element 65d operates to control output of the second modulation current in response to the control signal 150. It should be noted that, the junctures 65c and 63c may be viewed as a single juncture, and the third capacitor 65f and the fourth capacitor 65e may be omitted upon practical conditions in other embodiments, not affecting operations and functions of the photovoltaic circuit 6; this will be readily appreciated by those skilled in the art and thus will not be described again herein.

Additionally, the second process module 67 comprises a third capacitor 67f, a fourth capacitor 67e, a third inductor 67i, a fourth inductor 67g, a second switch element 67d and a second direction element 67h. The third capacitor 67f has a positive terminal and a negative terminal, the fourth capacitor 67e has a positive terminal, the second switch element 67d has a source, a gate and a drain, and the second direction element 67h has a positive terminal. Elements of the second process module 67 are connected in the same way as those of the second process module 65, and thus no redundant description will be made herein. It should be noted that, the junctures 67c and 63c may be viewed as a single juncture, and the third capacitor 67f and the fourth capacitor 67e may be omitted upon practical conditions in other embodiments, not affecting operations and functions of the photovoltaic circuit 6; this will be readily appreciated by those skilled in the art and thus will not be described again herein.

Figure 6:
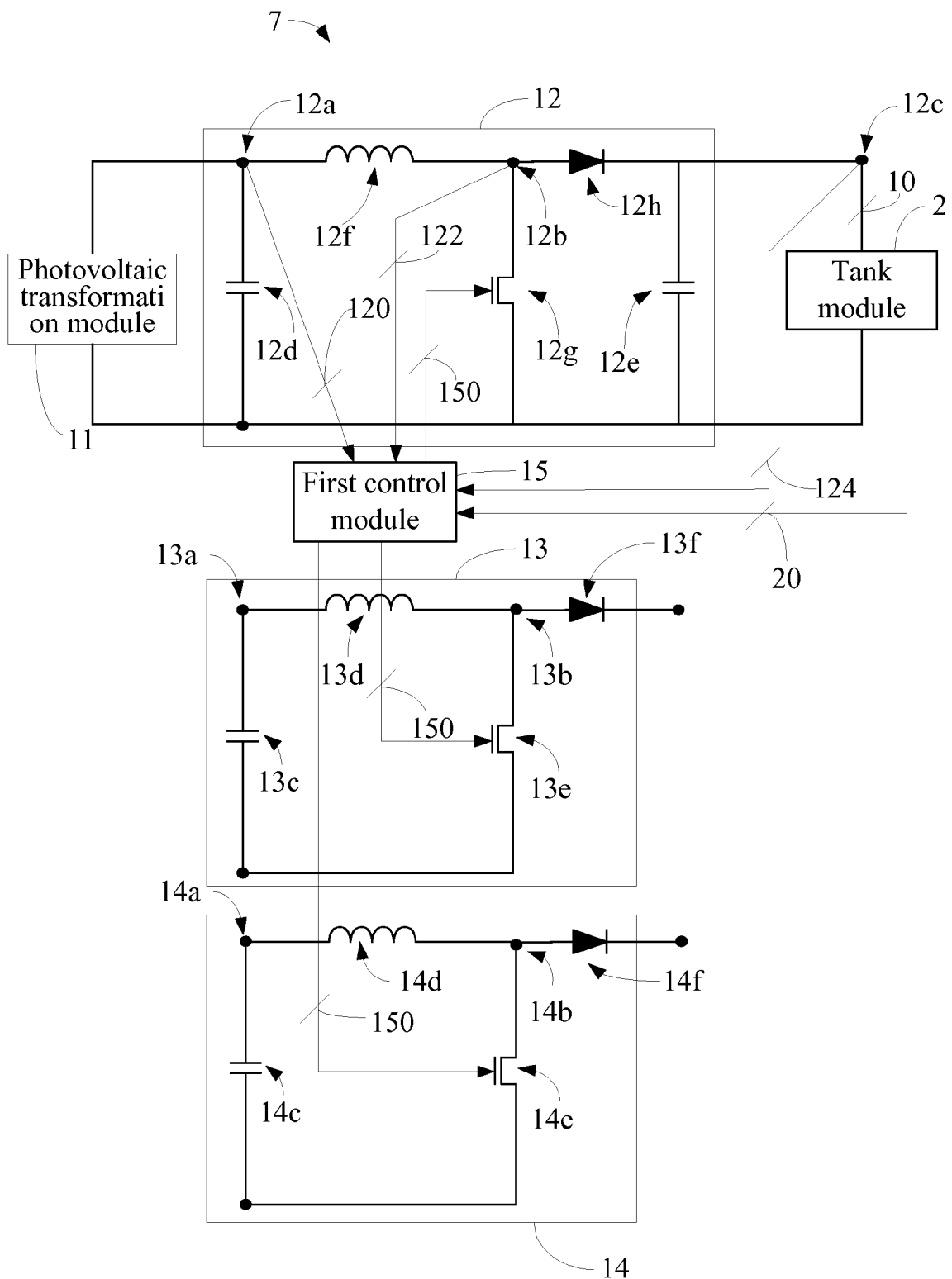
FIG. 6 is a schematic view of a fourth embodiment of the present invention.

A fourth embodiment of the present invention is illustrated in FIG. 6, which is a schematic view of a photovoltaic circuit 7. The photovoltaic circuit 7 is coupled to a tank module 2 and a photovoltaic transformation module 11. The photovoltaic transformation module 11 is configured to receive an optical energy and transform the optical energy into a current. The photovoltaic circuit 7 is configured to receive and modulate the current into an output current 10 to be supplied to the tank module 2. The photovoltaic circuit 7 comprises a first process module 12, a plurality of second process modules (i.e., a second process module 13 and a second process module 14 in this preferred embodiment) and a first control module 15. Hereinafter, only differences between the photovoltaic circuit 7 and the photovoltaic circuit 1 of the previous embodiment will be described, and the identical portions of the photovoltaic circuit 7 and the photovoltaic circuit 1 are omitted herein.

The photovoltaic circuit 7 differs from the photovoltaic circuit 1 in that, the first control module 15 outputs the output current 10 to the tank module 2 in a maximum power point tracking (MPPT) way, which is detailed as follows. The first control module 15 detects a tank status signal 20 generated by the tank module 2 and generates a charge protection signal in response to the tank status signal 20 so that, in response to the charge protection signal, the process modules output the first modulation current as the output current 10 to be supplied to the tank module 2. Specifically, the tank module 2 generates the tank status signal 20 in response to a terminal voltage or a terminal voltage variation rate of an energy input terminal, i.e., the juncture 12c.

Thus, magnitude of the output current 10 can be modulated by the first control module 15 according to the tank status and the MPPT way.

Particularly, the first control module 15 is configured to detect a tank status of the tank module 2, e.g, detecting whether the tank module 2 is getting close to a fully charged status in the charging course, and generate the charge protection signal according to the tank status of the tank module 2 so that the magnitude of the output current 10 can be modulated in response to the charge protection signal and the MPPT way. For example, the charge protection signal may be an adjustable periodic pulse charging switch signal. Then the original switching signal for switching the switch element generated according to the PMMT way is multiplied with the periodic pulse charging switching signal. In other words, upon how the tank status signal 20 is generated, a duty of the periodic pulse charging switching signal may be generated in response to the terminal voltage or the terminal voltage variation rate of the tank module 2. Also, the charge protection signal may be a pulse signal with an adjustable duty, and the first control module 15 controls and averages the magnitude of the output current 10 by modulating the duty of the pulse signal.

It should be noted that, the terminal voltage and the duty described above have characteristics that, when the closer the tank module 2 is getting to the full charged status, the terminal voltage is higher and the terminal voltage rising rate of the tank module 2 will rise more quickly. Hence, the first control module 15 may control the switch elements in the process modules by modulating the duty of the periodic pulse charging switching signal according to the value of the terminal voltage or the voltage rising rate of the tank module 2, so as to obtain a pulse charging effect. By modulating the duty of the periodic pulse charging switching signal, the average magnitude of the charging current can be controlled. Additionally, the duty becomes lower when the terminal voltage of the tank module 2 goes higher or the voltage rising rate goes lower, which helps to shorten the charging duration and prolong the service life of the tank module 2.

Figure 7:
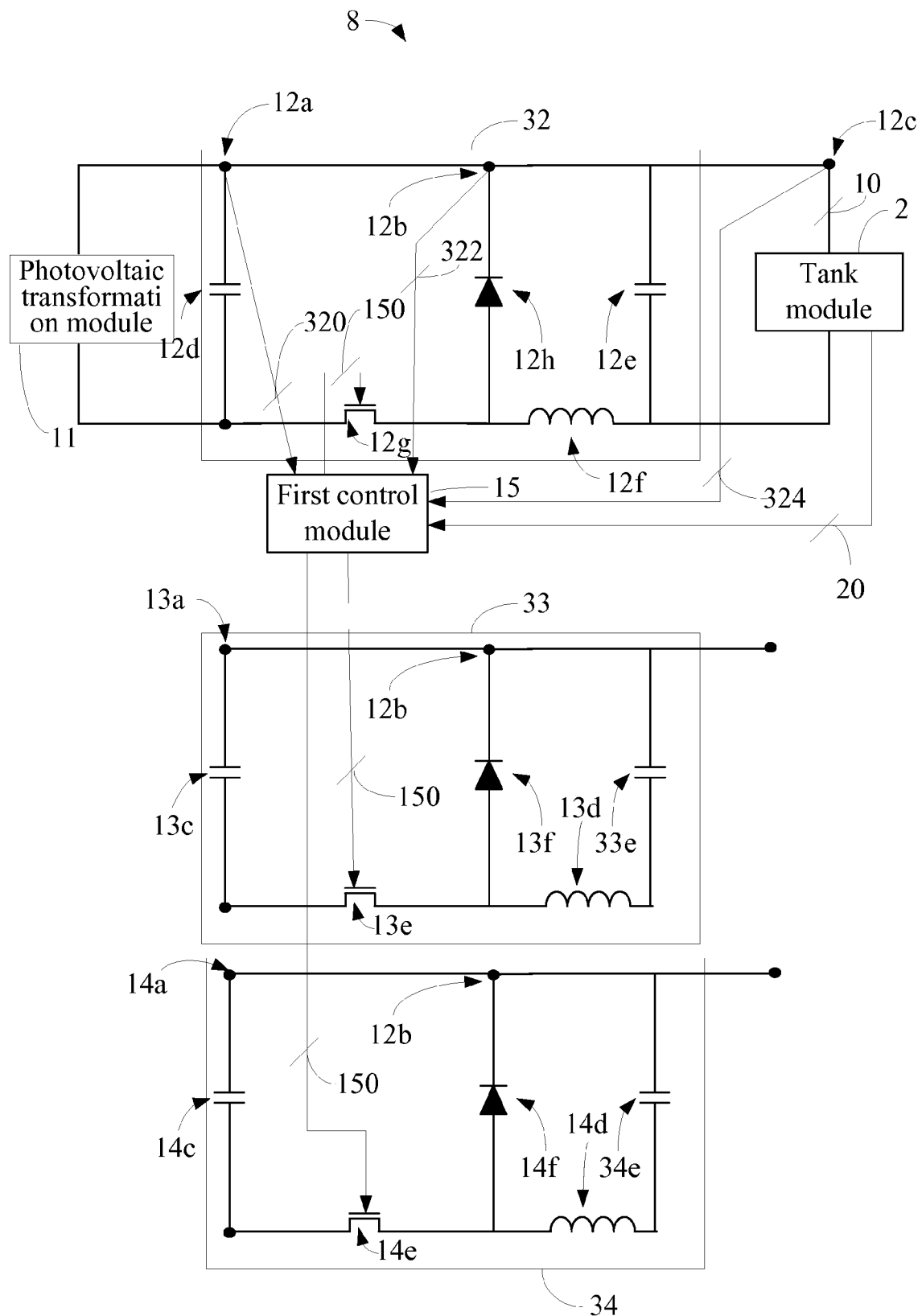
FIG. 7 is a schematic view of a fifth embodiment of the present invention.

A fifth embodiment of the present invention is illustrated in FIG. 7, which is a schematic view of a photovoltaic circuit 8. Hereinafter, only differences between the photovoltaic circuit 8 and the photovoltaic circuit 3 of the previous embodiment will be described, and identical portions of the photovoltaic circuit 8 and the photovoltaic circuit 3 are omitted herein.

The photovoltaic circuit 8 differs from the photovoltaic circuit 3 in that, the first control module 15 is configured to detect a tank status of the tank module 2 and generate a charge protection signal in response to the tank status signal 20 so that, in response to the charge protection signal, the process modules output modulation currents as the output current 10 to be supplied to the tank module 2. This will be readily appreciated upon reviewing the fourth embodiment, and thus will not be further described herein.

Figure 8:
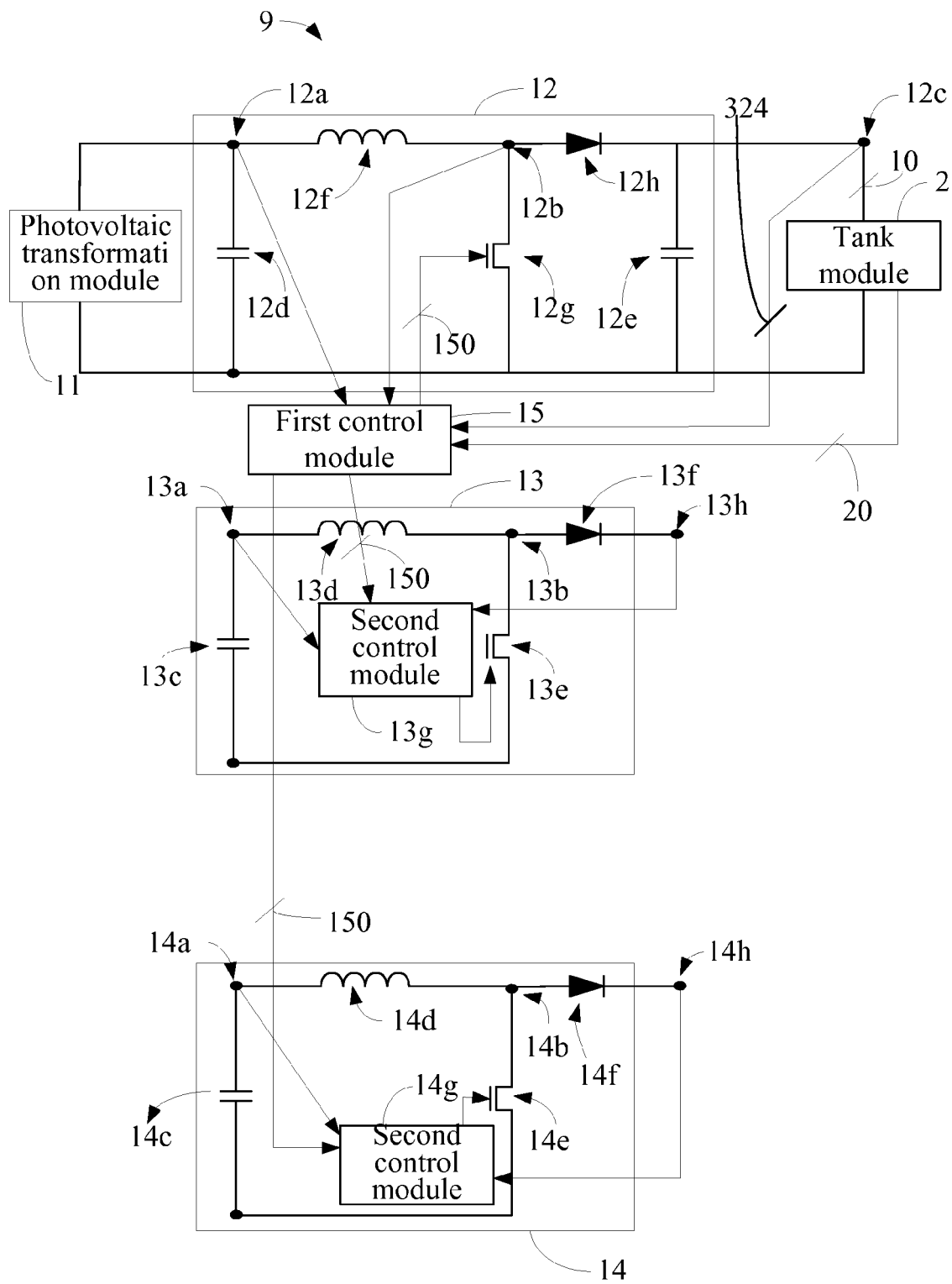
FIG. 8 is a schematic view of a sixth embodiment of the present invention.

A sixth embodiment of the present invention is illustrated in FIG. 8, which is a schematic view of a photovoltaic circuit 9. Hereinafter, only differences between the photovoltaic circuit 9 and the photovoltaic circuit 4 of the previous embodiment will be described, and identical portions of the photovoltaic circuit 9 and the photovoltaic circuit 4 are omitted herein.

The photovoltaic circuit 9 differs from the photovoltaic circuit 4 in that, the first control module 15 is configured to detect a tank status of the tank module 2 and generate a charge protection signal in response to the tank status signal 20 so that, in response to the charge protection signal, the process modules output modulation currents as the output current 10 to be supplied to the tank module 2. This will be readily appreciated upon reviewing the fourth embodiment, and thus will not be further described herein.

Figure 9:
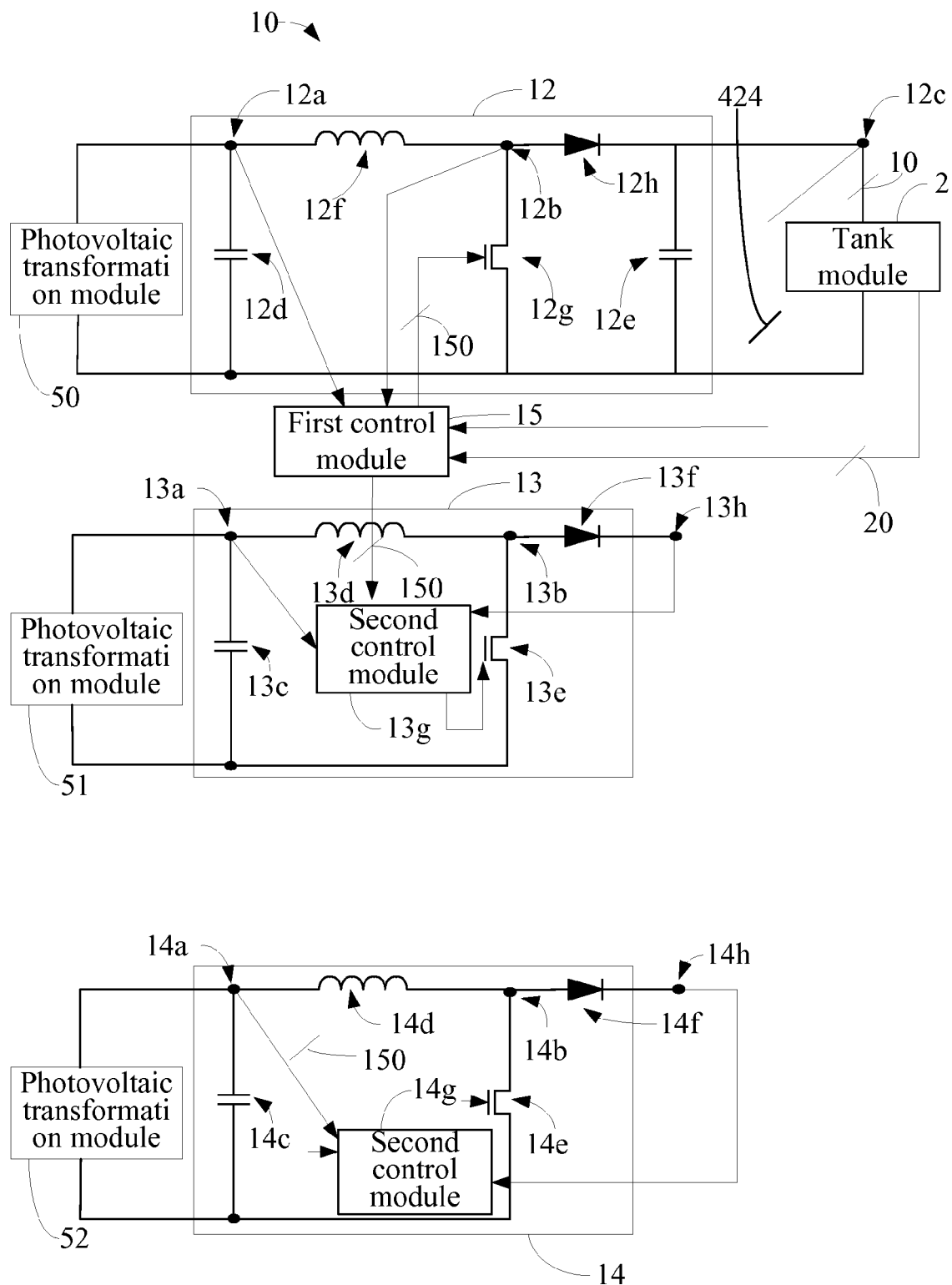
FIG. 9 is a schematic view of a seventh embodiment of the present invention.

A seventh embodiment of the present invention is illustrated in FIG. 9, which is a schematic view of a photovoltaic circuit 10. Hereinafter, only differences between the photovoltaic circuit 10 and the photovoltaic circuit 5 of the previous embodiment will be described, and identical portions of the photovoltaic circuit 10 and the photovoltaic circuit 5 are omitted herein.

The photovoltaic circuit 10 differs from the photovoltaic circuit 5 in that, the first control module 15 is configured to detect a tank status of the tank module 2 and generate a charge protection signal in response to the tank status signal 20 so that, in response to the charge protection signal, the process modules output modulation currents as the output current 10 to be supplied to the tank module 2. This will be readily appreciated upon reviewing the fourth embodiment, and thus will not be further described herein.

Figure 10:
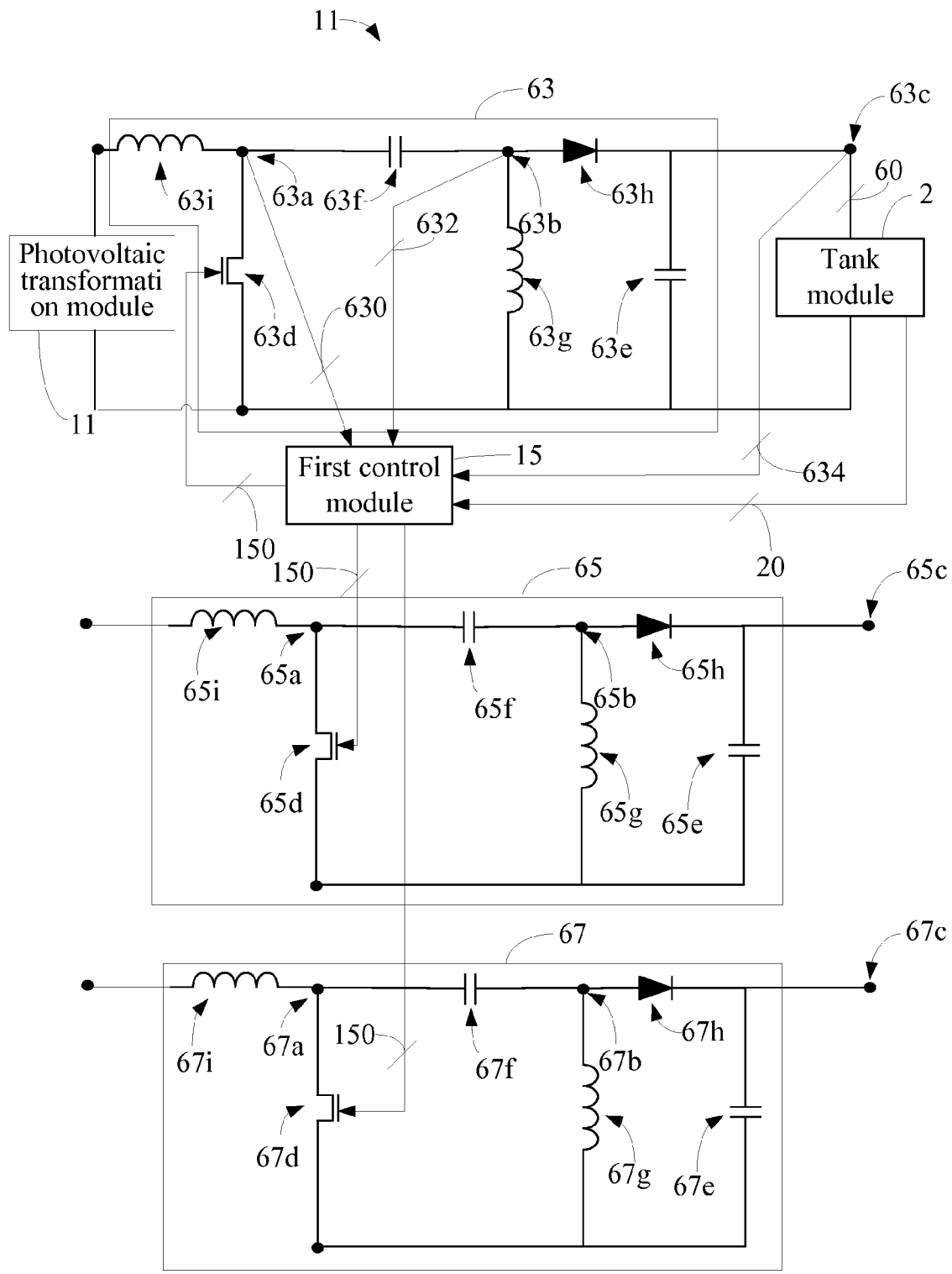
FIG. 10 is a schematic view of an eighth embodiment of the present invention.

An eighth embodiment of the present invention is illustrated in FIG. 10, which is a schematic view of a photovoltaic circuit 11. Hereinafter, only differences between the photovoltaic circuit 11 and the photovoltaic circuit 6 of the previous embodiment will be described, and identical portions of the photovoltaic circuit 11 and the photovoltaic circuit 6 are omitted herein.

The photovoltaic circuit 11 differs from the photovoltaic circuit 6 in that, the first control module 15 is configured to detect a tank status of the tank module 2 and generate a charge protection signal in response to the tank status signal 20 so that, in response to the charge protection signal, the process modules output modulation currents as the output current 60 to be supplied to the tank module 2. This will be readily appreciated upon reviewing the fourth embodiment, and thus will not be further described herein.

Figure 11:
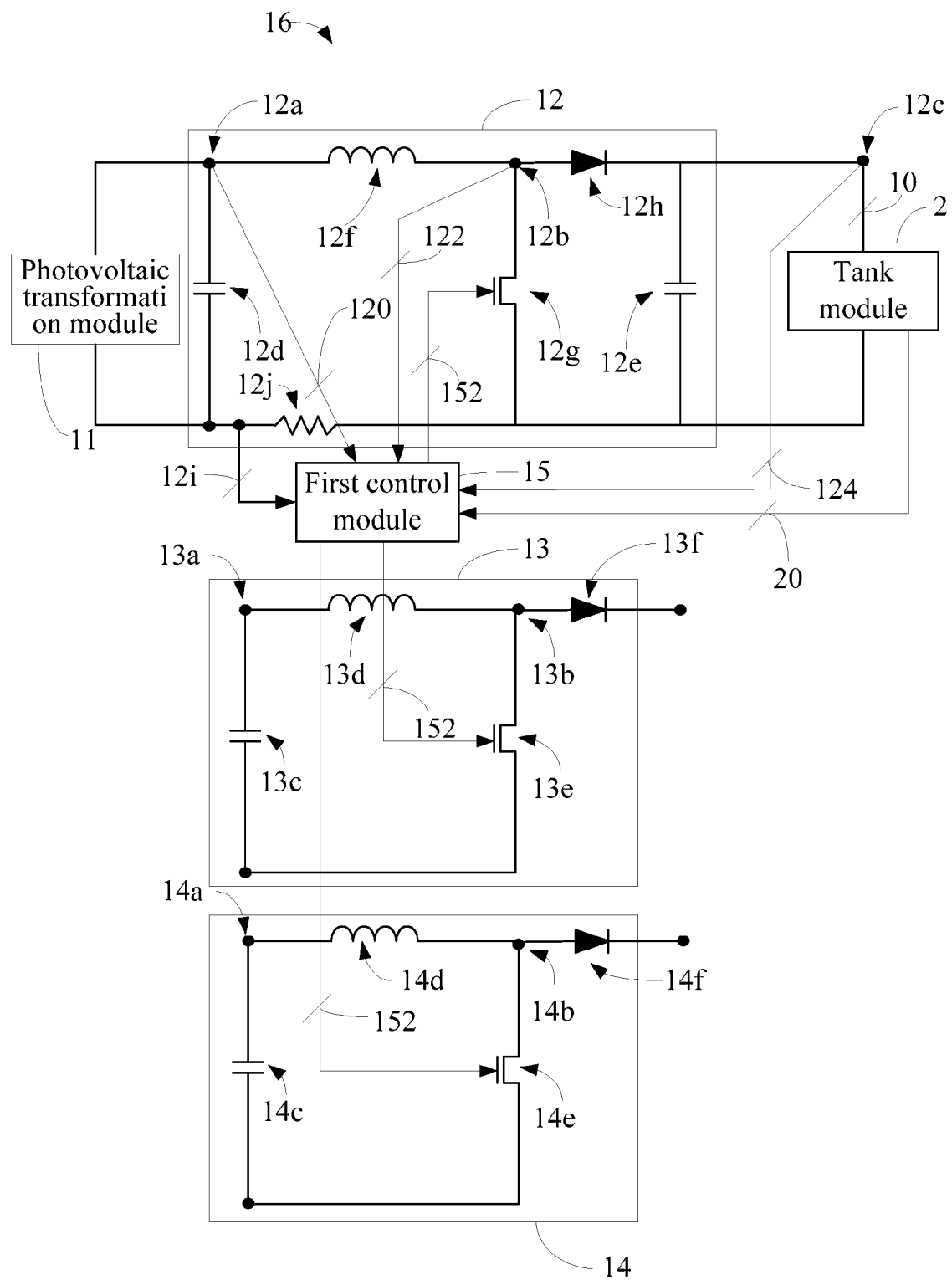
FIG. 11 is a schematic view of a ninth embodiment of the present invention.

A ninth embodiment of the present invention is illustrated in FIG. 11, which is a schematic view of a photovoltaic circuit 16. Hereinafter, only differences between the photovoltaic circuit 16 and the photovoltaic circuit 7 of the previous embodiment will be described, and identical portions of the photovoltaic circuit 16 and the photovoltaic circuit 7 are omitted herein.

The photovoltaic circuit 16 differs from the photovoltaic circuit 7 in that, the first process module 12 further comprises a resister 12$j$. The resister 12$j$ has a first terminal and a second terminal. The first switch element 12$g$ further has a drain, the first capacitor 12$e$ further has a negative terminal. The first terminal of the resister 12$j$ is connected to the drain of the first switch element 12$g$, the negative terminal of the first capacitor 12$e$, the tank module 2. Furthermore, the second terminal of the resister 12$j$ is coupled to the photovoltaic transformation module 11 and the first control module 15 so that the first control module 15 further generates a control signal 152 in response to a current 12$i$ on the second terminal of the resister 12$j$.

Specifically, in photovoltaic circuit 16, the control module 15 can know the exact strength of the current, which is generated by the photovoltaic transformation module 11, according to the current 12$i$ on the second terminal of the resister 12$j$. The first control module 15 can determine the number about the switch elements, which are need to be opened/closed, according to the current 12$i$. Then, the first control module 15 generates the control signal 152 to open/close the switch elements which are needed to be opened/closed.

Figure 12:
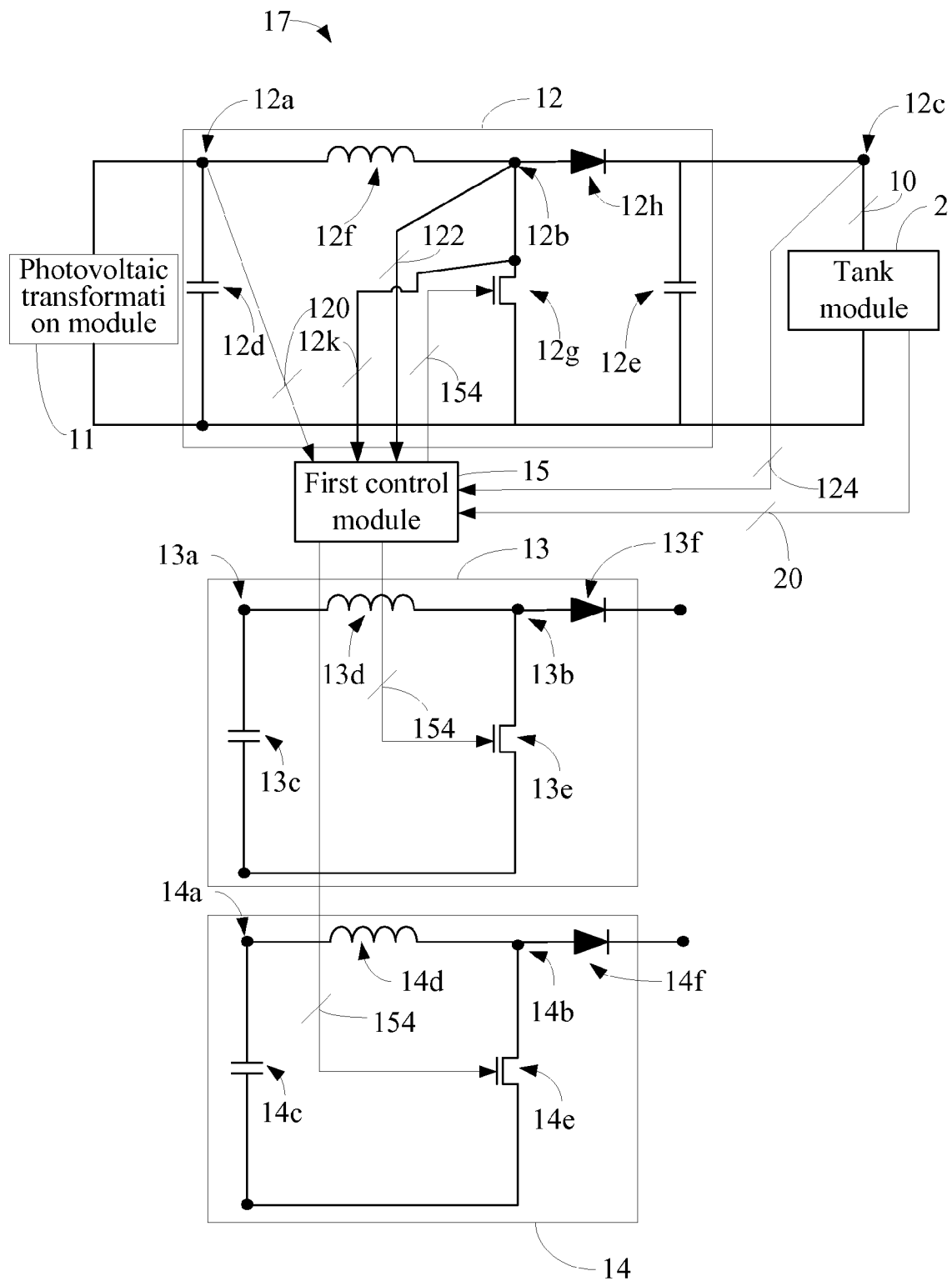
FIG. 12 is a schematic view of a tenth embodiment of the present invention.

A tenth embodiment of the present invention is illustrated in FIG. 12, which is a schematic view of a photovoltaic circuit 17. Hereinafter, only differences between the photovoltaic circuit 17 and the photovoltaic circuit 7 of the previous embodiment will be described, and identical portions of the photovoltaic circuit 17 and the photovoltaic circuit 7 are omitted herein.

The photovoltaic circuit 17 differs from the photovoltaic circuit 7 in that, the first control module 15 is coupled to the source of the first switch element 12$g$, so as to generate a control signal 154 in response to a voltage 12$k$ on the source of the first switch element 12$g$. Specifically, in photovoltaic circuit 12, the control module 15 can know the strength of the current, which is generated by the photovoltaic transformation module 11, according to the voltage 12$k$ on the source of the first switch element 12$g$. Comparing with the photovoltaic circuit 12, the loss of the power in the photovoltaic circuit 17 can be reduced effectively because it know the strength of the current generated by the photovoltaic transformation module 11 without the resister 12$j$.

Figure 13:
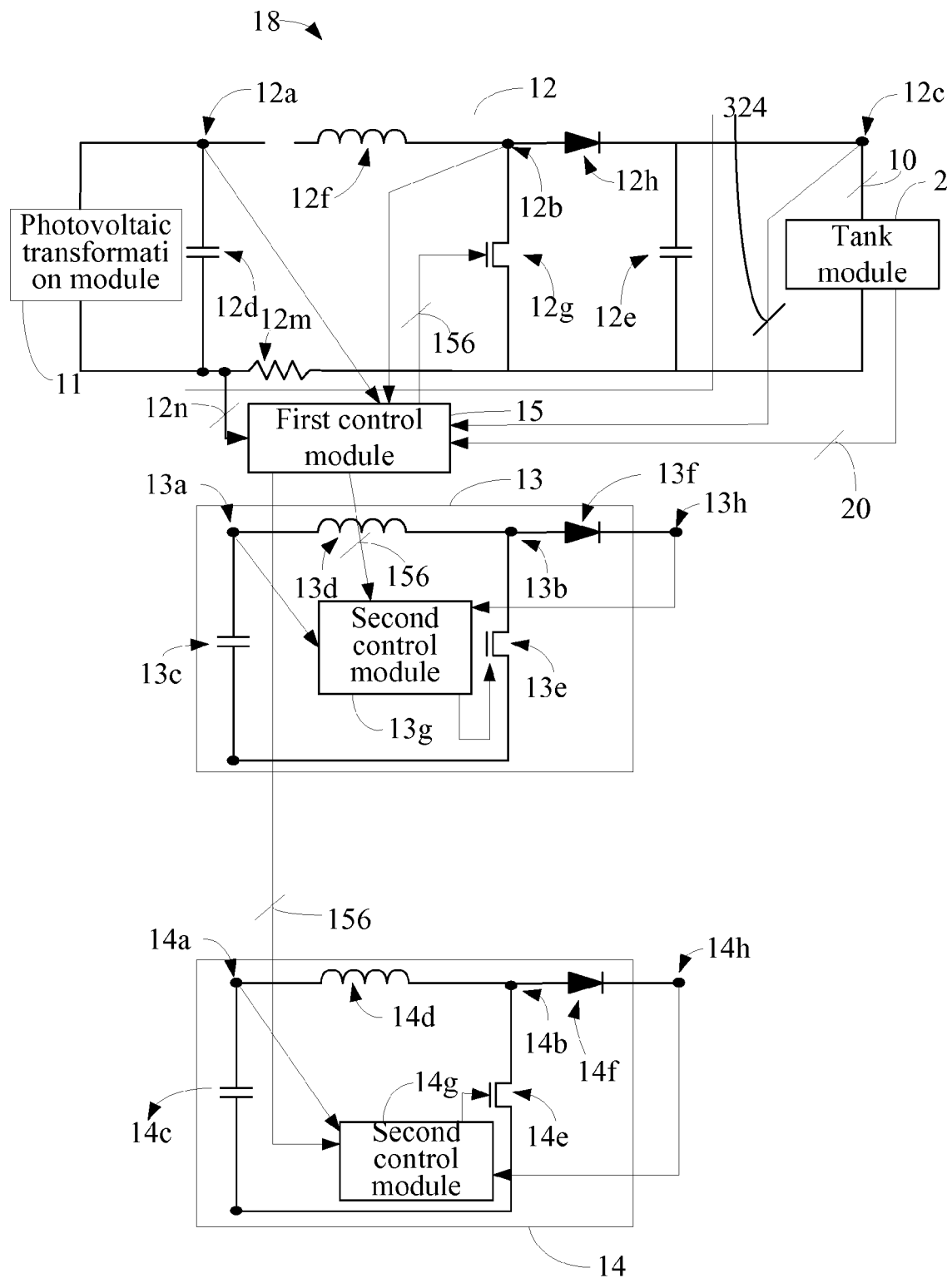
FIG. 13 is a schematic view of an eleventh embodiment of the present invention.

An eleventh embodiment of the present invention is illustrated in FIG. 13, which is a schematic view of a photovoltaic circuit 18. Hereinafter, only differences between the photovoltaic circuit 18 and the photovoltaic circuit 9 of the previous embodiment will be described, and identical portions of the photovoltaic circuit 18 and the photovoltaic circuit 9 are omitted herein.

The photovoltaic circuit 18 differs from the photovoltaic circuit 9 in that, the first process module 12 further comprises a resister 12$m$. The resister 12$m$ has a first terminal and a second terminal. The first switch element 12$g$ further has a drain, the first capacitor 12$e$ further has a negative terminal. The first terminal of the resister 12$m$ is connected to the drain of the first switch element 12$g$, the negative terminal of the first capacitor 12$e$, the tank module 2. Furthermore, the second terminal of the resister 12$m$ is coupled to the photovoltaic transformation module 11 and the first control module 15 so that the first control module 15 further generates a control signal 156 in response to a current 12$n$ on the second terminal of the resister 12$m$.

Specifically, in photovoltaic circuit 18, the control module 15 can know the exact strength of the current, which is generated by the photovoltaic transformation module 11, according to the current 12$n$ on the second terminal of the resister 12$m$. The first control module 15 can determine the number about the switch elements, which are need to be opened/closed, according to the current 12$n$. Then, the first control module 15 generates the control signal 154 to open/close the switch elements which are needed to be opened/closed.

Figure 14:
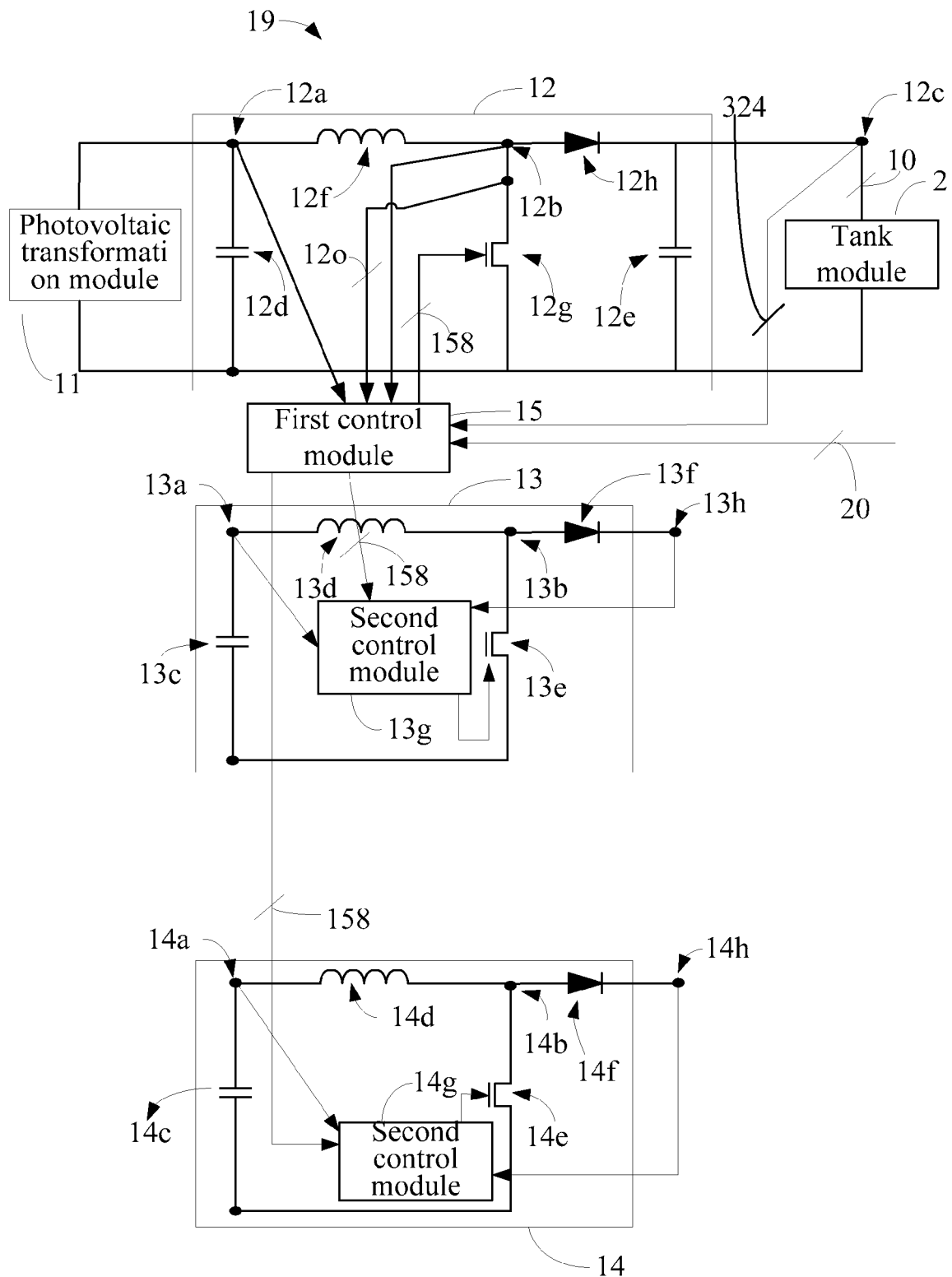
FIG. 14 is a schematic view of a twelfth embodiment of the present invention.

A twelfth embodiment of the present invention is illustrated in FIG. 14, which is a schematic view of a photovoltaic circuit 19. Hereinafter, only differences between the photovoltaic circuit 19 and the photovoltaic circuit 9 of the previous embodiment will be described, and identical portions of the photovoltaic circuit 19 and the photovoltaic circuit 9 are omitted herein.

The photovoltaic circuit 19 differs from the photovoltaic circuit 9 in that, the first control module 15 is coupled to the source of the first switch element 12$g$, so as to generate a control signal 158 in response to a voltage 12$o$ on the source of the first switch element 12$g$. Specifically, in photovoltaic circuit 19, the control module 15 can know the strength of the current, which is generated by the photovoltaic transformation module 11, according to the voltage 12$o$ on the source of the first switch element 12$g$. Comparing with the photovoltaic circuit 18, the loss of the power in the photovoltaic circuit 19 can be reduced effectively because it know the strength of the current generated by the photovoltaic transformation module 11 without the resister 12$m$.

In summary, each of the control modules of the present invention is implemented by a hardware circuit without need of additional program codes programmed by a software engineer. Moreover, the process modules of the present invention are connected in parallel to reduce power of the current, thus preventing damage of the control modules due to a too large current.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A photovoltaic circuit for supplying an output current, the photovoltaic circuit being coupled to a tank module and a photovoltaic transformation module, the photovoltaic transformation module being configured to receive an optical energy and transform the optical energy into a current, the photovoltaic circuit being configured to receive and modulate the current as the output current supplied to the tank module, the tank module generating a tank status signal, the photovoltaic circuit comprising:
   a first process module, being coupled to the tank module and the photovoltaic transformation module, and configured to generate a first divided current in response to the current and modulate the first divided current to generate a first modulation current, the first process module comprising:
      a first capacitor, having a positive terminal, the first capacitor being connected to the photovoltaic transformation module, the first switch element, the second capacitor and the tank module in parallel;
      a second capacitor;
      a first switch element, having a source and a gate;
      a first inductor, being connected to the positive terminal of the first capacitor and the source of the first switch element; and
      a first direction element, having a positive terminal and a negative terminal, the positive terminal of the first direction element being connected to the source of the first switch element, the negative terminal of the first direction element being connected to the positive terminal of the first capacitor;
   a plurality of second process modules, being connected to the first process module in parallel and coupled to the tank module and the photovoltaic transformation module, and configured to generate a plurality of second divided currents in response to the current and modulate the second divided currents to generate a plurality of second modulation currents; and
   a first control module, being connected to the gate of first switch element of the first process module, the second process modules and the tank module, and configured to generate a charge protection signal in response to the tank status signal of the tank module and generate a control signal to the process modules in response to the first divided current, the first modulation current, a last output current, the charge protection signal and an maximum power point tracking (MPPT) way so that the process modules output the modulation currents as the output current supplied to the tank module in a interlaced way in response to the charge protection signal, and the first switch element of the first process module operates to control output of the first modulation current in response to the control signal.

2. The photovoltaic circuit as claimed in claim 1, wherein each of the second process modules comprises:
   a third capacitor, having a positive terminal;
   a second inductor;
   a second switch element, having a source and a gate; and
   a second direction element, having a positive terminal and a negative terminal;
   wherein the third capacitor is connected to the photovoltaic transformation module, the second switch element, and the tank module in parallel, the second inductor is connected to the positive terminal of the third capacitor and the source of the second switch element, the positive terminal of the second direction element is connected to the source of the second switch element, the negative terminal of the second direction element is connected to the positive terminal of the third capacitor, the first control module is coupled to the gate of the second switch element of each of the second process modules so that the second switch element of each of the second process module operates to control output of the second modulation current in response to the control signal.

3. The photovoltaic circuit as claimed in claim 1, wherein each of the second process modules comprises
   a third capacitor, having a positive terminal;
   a second inductor;
   a second switch element, having a source and a gate;
   a second direction element, having a positive terminal and a negative terminal; and
   a second control module;
   wherein the third capacitor is connected to the photovoltaic transformation module, the second switch element, and the tank module in parallel, the second inductor is connected to the positive terminal of the third capacitor and the source of the second switch element, the positive terminal of the second direction element is connected to the source of the second switch element, the negative terminal of the second direction element is connected to the positive terminal of the third capacitor, the second control module is connected to the gate of the second switch element, the first control module is connected to each of the control modules so that each of the second control modules enable the second switch element of the second process module to operate to control output of the second modulation current in response to the control signal.

4. The photovoltaic circuit as claimed in claim 1, wherein the tank module comprises an energy input terminal and generates the tank status signal in response to a terminal voltage of the energy input terminal.

5. The photovoltaic circuit as claimed in claim 1, wherein the tank module comprises an energy input terminal and generates the tank status signal in response to a terminal voltage variation rate of the energy input terminal.

6. The photovoltaic circuit as claimed in claim 1, wherein the charge protection signal is an impulse signal having an modulated duty, the first control module controls and averages magnitude of the output current by modulating the modulated duty.

7. The photovoltaic circuit as claimed in claim 1, wherein the first process module comprises a resister having a first terminal and a second terminal, the first switch element has a drain, the first capacitor has a negative terminal, the first terminal of the resister is connected to the drain of the first switch element, the negative terminal of the second capacitor and the tank module, the second terminal of the resister is coupled to the photovoltaic transformation module and the first control module so that the first control module further generates the control signal in response to a current on the second terminal of the resister.

8. The photovoltaic circuit as claimed in claim 1, wherein the first control module is coupled to the source of the first switch element to further generate the control signal in response to a voltage on the source of the first switch element.

9. A photovoltaic circuit for supplying an output current, the photovoltaic circuit being coupled to a tank module and a plurality of photovoltaic transformation modules, each of the photovoltaic transformation modules being configured to receive an optical energy and transform the optical energy into a current, the photovoltaic circuit being configured to receive and modulate the currents as the output current supplied to the tank module, the photovoltaic transformation modules consisting of a first photovoltaic transformation module and a plurality of second photovoltaic transformation modules, the tank module generating a tank status signal, the photovoltaic circuit comprising:
- a first process module, being connected to the first photovoltaic transformation module and the tank module in series, and configured to generate a first divided current in response to the current transformed by the first photovoltaic transformation module and modulate the first divided current to generate a first modulation current, the first process module comprising:
  - a first capacitor, having a positive terminal, the first capacitor being connected to the first photovoltaic transformation module, the first switch element, the second capacitor and the tank module in parallel;
  - a second capacitor;
  - a first switch element, having a source and a gate;
  - a first inductor, being connected to the positive terminal of the first capacitor and the source of the first switch element; and
  - a first direction element, having a positive terminal and a negative terminal, the positive terminal of the first direction element being connected to the source of the first switch element, the negative terminal of the first direction element being connected to the positive terminal of the first capacitor;
- a plurality of second process modules, being connected to the first process module in parallel, each of the second process modules being connected to one corresponding second photovoltaic transformation module of the second photovoltaic transformation modules and the tank module in series, the second process modules being configured to generate a plurality of second divided currents in response to the currents transformed by the second photovoltaic transformation modules and modulate the second divided currents to generate a plurality of second modulation currents; and
- a first control module, being connected to the gate of first switch element of the first process module, the second process modules and the tank module, and being configured to generate a charge protection signal in response to the tank status signal of the tank module and generate a control signal to the process modules in response to the first divided current, the first modulation current, a last output current, the charge protection signal and an maximum power point tracking (MPPT) way so that the process modules output the modulation currents as the output current supplied to the tank module in a interlaced way in response to the charge protection signal, and the first switch element of the first process module operates to control output of the first modulation current in response to the control signal.

10. The photovoltaic circuit as claimed in claim 9, wherein each of the second process modules comprises
   - a third capacitor, having a positive terminal;
   - a second inductor;
   - a second switch element, having a source and a gate;
   - a second direction element, having a positive terminal and a negative terminal; and
   - a second control module;
   wherein the third capacitor is connected to the corresponding second photovoltaic transformation module, the second switch element, and the tank module in parallel, the second inductor is connected to the positive terminal of the third capacitor and the source of the second switch element, the positive terminal of the second direction element is connected to the source of the second switch element, the negative terminal of the second direction element is connected to the positive terminal of the third capacitor, the second control module is connected to the gate of the second switch element, the first control module is connected to each of the second control modules so that each of the second control modules enable the second switch element of the second process module to operate to control output of the second modulation current in response to the control signal.

11. The photovoltaic circuit as claimed in claim 9, wherein the tank module comprises an energy input terminal and generates the tank status signal in response to a terminal voltage of the energy input terminal.

12. The photovoltaic circuit as claimed in claim 9, wherein the tank module comprises an energy input terminal and generates the tank status signal in response to a terminal voltage variation rate of the energy input terminal.

13. The photovoltaic circuit as claimed in claim 9, wherein the charge protection signal is an impulse signal having an modulated duty, the first control module controls and averages magnitude of the output current by modulating the modulated duty.

14. The photovoltaic circuit as claimed in claim 9, wherein the first process module comprises a resister having a first terminal and a second terminal, the first switch element has a drain, the first capacitor has a negative terminal, the first terminal of the resister is connected to the drain of the first switch element, the negative terminal of the second capacitor, the tank module and the second terminal of the resister is coupled to the photovoltaic transformation module and the first control module so that the first control module further generates the control signal in response to a current on the second terminal of the resister.

15. The photovoltaic circuit as claimed in claim 9, wherein the first control module is coupled to the source of the first switch element to further generate the control signal in response to a voltage on the source of the first switch element.

* * * * *